Nov. 3, 1970  G. M. FEDERSPILL  3,537,292
METHOD OF MAKING BUSHING FROM ROLLED STRIP
Original Filed Nov. 19, 1965
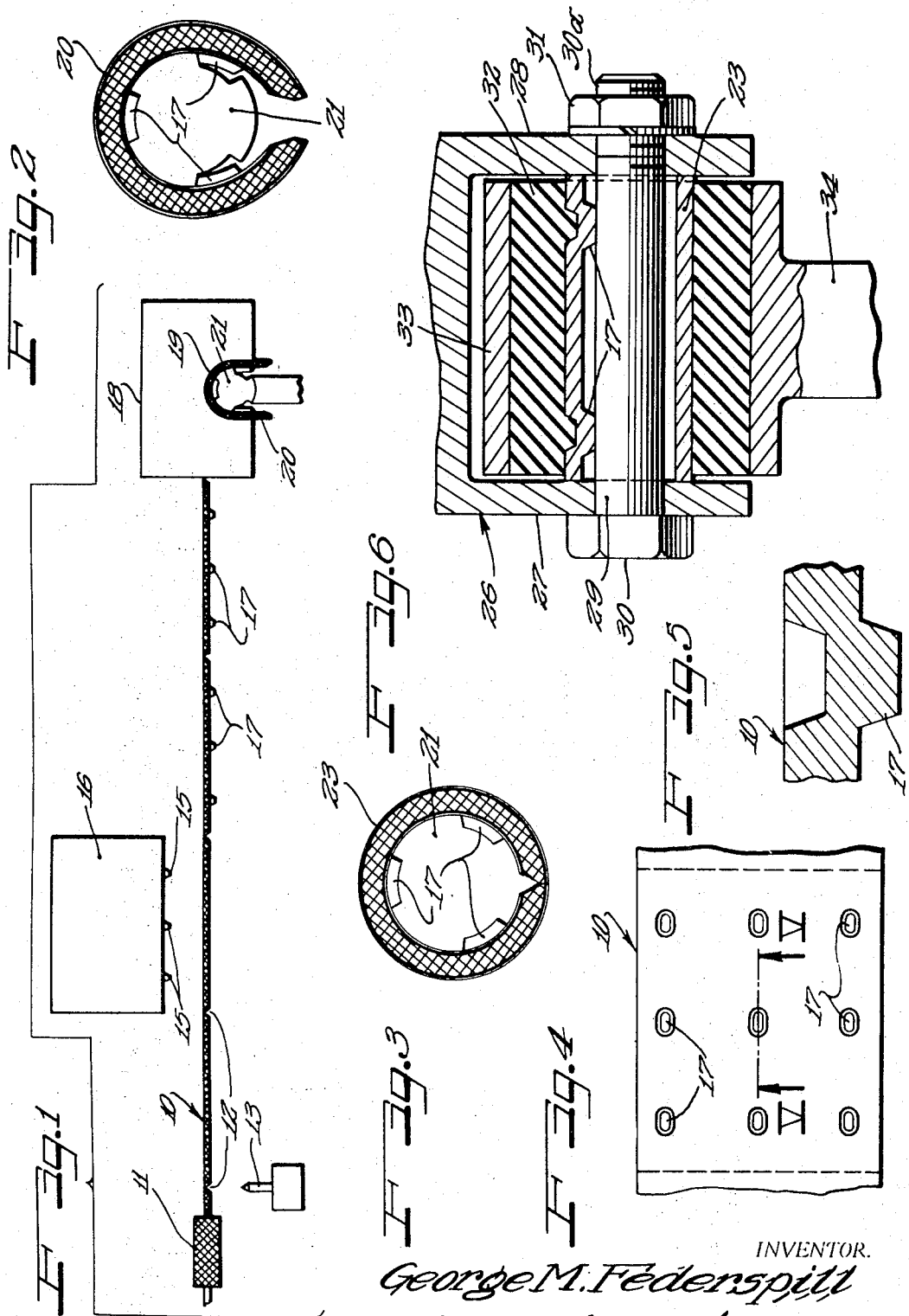
INVENTOR.
George M. Federspill
ATTORNEYS

United States Patent Office 3,537,292
Patented Nov. 3, 1970

3,537,292
METHOD OF MAKING BUSHING FROM ROLLED STRIP
George M. Federspill, Kokomo, Ind., assignor to Steel Parts Corporation, Tipton, Ind., a corporation of Indiana
Original application Nov. 19, 1965, Ser. No. 508,766. Divided and this application Aug. 15, 1968, Ser. No. 772,877
Int. Cl. B21c 37/20
U.S. Cl. 72—368
7 Claims

ABSTRACT OF THE DISCLOSURE

A method of making bushings from a flat rolled strip in which the underside of the strip is successively coined with equally spaced parallel transversely extending V-shaped grooves and the top side of the strip is punched partially through the strip between the coined grooves to provide a plurality of embossments projecting from the coined side of the strip. The strip is successively severed along the coined grooves and as severed is formed to a U-shaped form on a mandrel, which is splined to receive the embossments. The strip is then closed to a cylindrical form about the mandrel by a series of successive cold forming operations and removed from the end of the mandrel. Opposite edges of the strip are knurled prior to coining.

---

This application is a division of my application Ser. No. 508,766, filed Nov. 19, 1965, now abandoned.

This invention is particularly concerned with the making of a bushing for use in flexible joints, such as commonly used in automotive steering and suspension systems. These joints usually consist of a yoke type housing having a supporting bolt extending through laterally spaced walls thereof, a bushing carried by the bolt and held from rotation by engagement of the walls of the housing with the ends of the bushings, usually being effected by the tightening of a nut on the bolt extending through the bushing and walls. In such structures, a cylindrical elastic body made of a resilient material, such as rubber composition is bonded to the exterior of the bushing between the walls of the housing and is also bonded to the interior of a concentric cylindrical member, which carries an arm integral therewith or affixed thereto. This arm extends to another member of the steering or suspension system and forms a part of the system. Relative movement of the arm about the bushing and the parts connected to the arm is solely by flexing of the cylindrical elastic body.

It is a prerequisite that the bushing be of a relatively large outside diameter to afford ample surface for bonding the elastic member thereto. It is also desirable that the inner diameter of the bushing be relatively small to permit a bearing contact with the bolt, which for purposes of economy, standardization and minimum weight, has an external diameter much less than the internal diameter of the tubular member of the bushing, to which the elastic body is bonded.

In the past, these requirements have been partially met by either using a thick walled bushing or by providing a liner for the bushing, the inner diameter of which affords bearing contact with the bolt.

The thick walled bushings are relatively expensive and difficult to form by cold working processes usually employed to keep down the cost of the bushing. The provision of a liner, while making it possible to employ a bushing that may be formed by cold working, adds to the cost of the bushing assembly and involves problems in securing the bushing and liner against longitudinal displacement. In accordance with the principles of the present invention, the foregoing deficiencies are cured by providing a bushing made from a rolled strip, portions of which are punched partially through at the termination of the embossing operation, to provide a plurality of embossments of the same diameter having bearing engagement with the bolt at a plurality of spaced points and at the same time to provide the required large exterior surface when the strip is formed to the form of a bushing, to provide adequate peripheral surface for the bonding of the bushing thereto.

A principal object of the invention is to provide a simple and improved method of producing a bushing by coining one side of an elongated metal strip transversely thereof at a plurality of spaced points to define the length of the bushing and by successively embossing the strip from the other side of the strip, to provide a plurality of spaced lugs or embossments extending from the strip of metal, and then by cutting blanks of coined and embossed strips along the coined portions thereof, and forming the blanks to the form of a bushing with the lugs or embossments extending inwardly therefrom in a series of cold forming operations.

These and other objects of the invention will appear from time to time as the following specification proceeds and with reference to the accompanying drawings wherein:

FIG. 1 is a diagrammatic view, diagrammatically illustrating certain steps in the formation of a bushing constructed in accordance with the principles of the present invention;

FIG. 2 is an end view of a partially formed bushing mounted on a mandrel and illustrating a second step in the formation of the bushing to a cylindrical form;

FIG. 3 is an end view of the bushing shown in FIG. 2, illustrating the completed bushing on its mandrel;

FIG. 4 is a plan view of a section of the strip, illustrating the embossment of the strip at the termination of an embossing operation, FIG. 5 is a fragmentary sectional view taken through the strip along line V—V of FIG. 4; and FIG. 6 is a fragmentary sectional view with parts shown in elevation, illustrating one manner in which the improved bushing of this invention may be used.

In the embodiment of the invention illustrated in the drawing, I have diagrammatically shown in FIG. 1 a rolled strip of metal 10 knurled along its opposite edges by knurling rollers 11 and transversely coined at uniformly spaced intervals along its bottom, to provide downwardly facing V-shaped coined grooves 12 therein, by coining dies 13. The coining operation may be effected after the knurling operation and the intervals of coining are determined by the length of the finished strip required to form a cylindrical bushing. At the termination of the coining operation the top surface of the strip is shown as being punched partially through by a series of punches 15, 15 carried in a punch block 16, between the coined grooves thereof, to form downwardly extending embossments or lugs 17 of a uniform depth, and uniformly spaced about the strip, as illustrated in FIG. 4. At the termination of the embossing operation, the strip is cut off by a cut off die 18 cutting the strip to individual blanks along the coined downwardly opening transverse recess 12 thereof. The cut off die 18 is shown as having a downwardly opening forming die surface 19 formed therein, partially forming the cut off blank 20 about a mandrel 21. The mandrel 21 is diagrammatically shown in FIG. 2 as extending transversely of the rolled strip 10 and may be of sufficient length to accommodate movement of the partially formed blank 20 along the mandrel for a second forming step on the mandrel, to the form generally shown in FIG. 2, by suitable forming dies (not shown) in a conventional manner. At the end of the second forming step the blank may be advanced along the mandrel for a third finish forming step by conventional forming dies, which may act thereon from opposite sides thereof to close the bushing and form the bushing to the form of a true cylinder.

The forming dies forming the blank into a cylindrical bushing may be conventional dies and are no part of the present invention so need not herein be shown or described further.

The bushing is thus formed in a simple manner by a series of sequential knurling, coining, embossing, cut off and forming steps, in which the blank is formed to its cylindrical form about the mandrel 21 in two additional sequential forming steps along the mandrel and then removed from the end of the mandrel. While the transverse coining step is described as being prior to the embossing step, it is, of course, obvious that it may be after the embossing step if desired.

The lugs or embossments 17, 17 are shown in FIG. 4 as being oval but may be rectangular or spherical, or of various other desired forms, to provide the final bushing with an effective internal diameter, which is substantially less than the internal diameter of the body of the completed tubular bushing, as worked into its final tubular form shown in FIGS. 3 and 6, and designated generally by reference character 23.

The method of utilization of the improved bushing of this invention in a steering or suspension joint of an automatic vehicle is shown in FIG. 7. As shown in that figure, a housing for the joint is designated by reference numeral 26 and consists of a lateral support which may be fastened to the vehicle frame and is provided with parallel depending walls 27 and 28 which may form a bracket for supporting the bushing 23 therebetween and which may be distorted inwardly toward each other under pressure into engagement with opposite ends of the bushing. The bushing 23 is mounted between the walls 27 and 28 on a bolt 29 having a cylindrical bearing surface engaged by the inner ends of the lugs and embossments 17. The bolt 29 has a head 30 engaging the outside of the wall 27, either directly or through the intermediary of a washer, and has an opposite projecting threaded end portion 30a, on which is mounted a nut 31 that may be drawn tightly against the outer face of the wall 28, to force the walls 27 and 28 toward each other and to cause the inner sides of said walls to be pressed into engagement with the opposite knurled ends of the bushing 23 with sufficient frictional engaging force to prevent turning of the bushing relative to the housing 26 and its walls 27 and 28.

Bonded or otherwise suitably permanently secured to the outer surface of the bushing 23 is a cylindrical elastic member 32 made from an elastic material such as rubber, an elastomer or any other well known substitute for rubber. The elastic member 32 is surrounded by a sleeve 33, which is also bonded thereto and is shown as having an arm 34 depending therefrom, which may be connected with another part of the automotive steering or suspension system. The arm 34 thus moves about the axis of the bushing 23 by the resiliency of the cylindrical elastic member 32 while the bushing 23 is held from rotation by the bolt 30 and engagement of the insides of the walls 27 and 28 with opposite ends thereof.

The embossments 17 thus afford spaced bearing contact with the outer surface of the bolt 29, which is considerably less than the major portion of the inner diameter of the wall of the bushing 23 and form integral spacers spacing the interior wall of the bushing proper a substantial distance from the bolt and thereby making is possible to provide a relatively large diameter exterior wall surface of the bushing for bonding or otherwise securing the elastic body thereto, the indentations forming the embossments increasing the contact area for the elastic bushing.

The bushing, therefore, makes it possible to use a relatively small diameter standard supporting bolt and at the same time provides a thin walled economical light weight bushing affording a large bonding area for the elastic body 32. Utilization of this invention thus makes it possible to provide single thickness unlined bushngs of a desired external diameter but at the same time having bearing surfaces for proper bearing contact with several supporting and securing bolts, and the embossments in addition to providing bearing contact with the bolts increase the external bonding area for the elastic body.

While I have herein shown and described one form in which the invention may be embodied, it should be understood that various variations and modifications in the invention may be attained without departing from the spirit and scope of the novel concepts thereof.

I claim as my invention:

1. The method of making a bushing from a rolled metal strip comprising the steps of:
   successively coining one side of the metal strip with V-shaped grooves extending transversely thereof at equal intervals, in accordance with the lengths of the completed blanks,
   punching the opposite side of the coined strip between the coined grooves partially through the strip, to provide a plurality of embossments projecting from the coined side of the strip,
   providing a mandrel splined to receive the embossments projecting from the strip,
   successively severing the coined strip into a flat blank along a V-shaped groove thereof, and forming the severed strip to a U-shaped form about the mandrel with the embossments extending between the splines thereof.
   and then closing the U-shaped partially formed severed strip to a cylindrical form about the mandrel.

2. The method of claim 1,
   wherein the U-shaped severed strip is closed to a cylindrical form in a series of successive cold forming operations at successive locations along the mandrel.

3. The method of claim 2,
   in which opposite edges of the strip are knurled by a a knurling operation prior to coining the downwardly opening V-shaped grooves therein.

4. The method of claim 1,
   wherein the formation of the U-shaped severed strip to a cylindrical form includes the step of forming the depending portions of the U about the mandrel to generally incline toward each other as formed about the mandrel and then completing the forming of the strip to a cylindrical form with the converging edges of the coined portions of the blank forming the V-shaped groove in abutting engagement with each other at the bottom of the formed cylinder on the mandrel, and then removing the formed bushing from the end of the mandrel.

5. The method of claim 1 including the step of:
   successively advancing the strip along its longitudinal axis, and performing the punching operation, at the termination of each successive advancing operation between each two previously coined grooves, and severing and forming the strip to a cylindrical form at the termination of a series of coining and punching operations.

6. The method of claim 5, wherein the closing of the U-shaped severed strip to a cylindrical form is attained by a series of successive cold forming operations about the mandrel, first partially closing the U-shaped severed strip and then forming the strip to a cylindrical form.

7. The method of claim 5 in which opposite edges of the strip are knurled during advance of the strip by a knurling operation prior to coining the V-shaped grooves therein.

References Cited

UNITED STATES PATENTS 2,702,429  2/1955  Peters, et al. _____ 72—129
2,812,003  11/1957  Schlichthaerle et al. ___ 72—130

LOWELL A. LARSON, Primary Examiner

U.S. Cl. X.R.

72—370